United States Patent Office 2,900,433
Patented Aug. 18, 1959

2,900,433

BARRIER FILMS FOR GALVANIC CELLS

Nelson C. Cahoon, Fairview Park, and Margaret P. Korver, Brecksville, Ohio, assignors to Union Carbide Corporation, a corporation of New York No Drawing. Application April 18, 1955
Serial No. 502,183

4 Claims. (Cl. 136—146)

This invention relates to permeable, bibulous methyl cellulose ether films adapted for use as barrier films in primary galvanic cells, particularly dry cells, to such barrier films and to cells containing such barrier films.

A common form of dry cell comprises an anode and a cathode and an intermediately disposed depolarizer mix which is moistened with an appropriate electrolyte. In the production of such cells it is necessary that separator media be interposed between the anode and the cathode mix, which separator media must be ionically permeable and bibulous. In the most effective and desirable types of separator media the face abutting the anode must be in close adhesive contact with the anode. Such portion of the separator medium is here designated the anode contact material. Such anode contact material practically invariably being soluble in the electrolyte, a layer of electrolyte-insoluble material must be provided to prevent migration and dissipation of the anode contact material, with resulting internal short circuit. Such layer of electrolyte-insoluble material is designated the barrier layer or film.

A conventional type of separator medium of the prior art has comprised the so-called paste separator in which kraft paper serves as the barrier layer. Another type of separator medium is proposed in U.S. Patent No. 2,534,336 in which the separator medium comprises an anode film portion which adheres to the anode and is substantially electrolyte-soluble which may comprise cast water-soluble alkyl cellulose ether, and an electrolyte-insoluble barrier layer portion comprising water-soluble methyl cellulose ether which has been insolubilized by treatment with citric acid or other disclosed insolubilizers. The latter electrolyte-insoluble film portion protects the electrolyte-soluble portion from excessive solution and dispersion. The suitable controlled insolubilization of water-soluble methyl cellulose ethers has proved difficult and duplication of results can be achieved only by the most rigorous control of various factors which renders the method difficult and not eminently desirable for commercial practice.

It is an object of this invention to provide an improved barrier film for incorporation in primary galvanic cells and a further object to provide a dry cell barrier film of uniformly high quality, production of which is relatively free from critical factors affecting properties of the film important in galvanic cell separator media such as permeability, ability to absorb electrolyte and solubility in electrolyte.

A further object of the invention is to provide a dry cell having substantially improved properties attributable to incorporation of barrier film of this invention. Still another object is to provide an improved barrier film for dry cells intended for low temperature storage or service. A still further object is to provide a barrier film uniquely adapted for use in dry cells having magnesium anodes.

Other objects of the invention will in part be obvious and will in part appear hereinafter.

We have discovered that methyl cellulose ethers having a methoxy content between about 10 percent and about 20 percent are admirably adapted as barrier films for incorporating into dry cells. Such film which is insoluble in water but soluble in dilute solutions of alkali in water is also insoluble in electrolytes employed in dry cells but nevertheless bibulous and permeable when in contact with such electrolytes.

The barrier films of this invention namely methyl cellulose ether films having a methoxy content between about 10 percent and about 20 percent are hereinafter also designated alkali soluble methyl cellulose ethers. They contribute surprisingly to shelf and service life of dry cells into which they are assembled. The shelf life of cells containing barrier films of the present invention is particularly striking when such cells are stored at elevated temperatures. Such cells show service life at least equal to that of prior art cells when stored at 21° C., considerably surpass that of prior art cells when stored at 45° C., and show 60 percent to 100 percent of their initial capacity after storage at 54° C. for six months, a condition under which cells containing barrier layers or films of the prior art fail or show a far greater diminution in capacity.

The alkali soluble methyl cellulose ether barrier films of this invention are uniquely stable in dry cell electrolytes and yet amply bibulous and ionically permeable to provide uniquely useful barrier films for dry cells. The barrier films of this invention are particularly advantageously employed in construction of dry cells intended for low temperature operation. It has been found that barrier films prepared by insolubilizing water-soluble methyl cellulose by treatment with citric acid or like insolubilizing reagents do not have desirable levels of mechanical stability in calcium chloride or lithium chloride electrolytes which are commonly employed in low temperature cells. Neither such separator media nor those comprising paste backed with paper show the necessary permeability or powers to absorb electrolyte at low temperatures to survive storage or extended drain at those temperatures.

Barrier films prepared from alkali soluble methyl cellulose having a methoxy content of between about 15 percent and 20 percent are not only highly stable but are bibulous and highly permeable to the diffusion of ions and electrolytes under low temperature operating conditions. Methyl cellulose films having less than about a 15 percent methoxy content are not sufficiently bibulous and permeable at low temperatures to meet exacting low temperature cell requirements. Low temperature cells incorporating barrier film of this invention show far greater shelf life and give better service at low temperatures than those having barrier layers or films previously known. Low temperature cells having an electrolyte comprising calcium chloride, ammonium chloride and water show service characteristics superior to a paste type cell employing kraft paper as a barrier, giving 59 percent more service when discharged at —65° C. than an entirely similar cell using kraft paper as a barrier.

The barrier films of this invention are particularly suited in construction of galvanic dry cells having magnesium anodes. Barrier films comprising insolubilized water-soluble methyl cellulose as described in U.S. Patent 2,534,336 have been found to disintegrate in the presence of the magnesium bromide electrolyte employed in these cells. On the other hand, we have found that barrier films comprising methyl cellulose having a 10–20 percent methoxy content are stable in the presence of electrolytes containing magnesium bromide and that in the presence of such electrolytes they possess a remarkable combination of bibulousness, permeability, stability and insolubility in the electrolyte which admirably suits them to use in a so-called magnesium cell. It has thus been found that a cell containing a magnesium anode, an anode film comprising cast water-soluble methyl cellulose, a barrier film according to the present invention, an electrolyte comprising an aqueous solution of magnesium bromide, a cathode and a cathodic depolarizer of magnesium oxide responds excellently to storage and service tests.

The solubility, the extent of permeability, and the bibulousness of a particular methyl cellulose ether film is dependent to some extent on the degree of methoxy substitution. Thus a low methoxy substitution tends to result in a less permeable, less bibulous material. The permeability of the film and diffusability through it of ions and products of decomposition migrating from the anode is lower at lower temperatures. It is for these reasons that a methoxy content of 15 percent to 20 percent is desired in film employed in low temperature cells. Methoxy contents in excess of 20 percent are not desired in any case because as the methoxy content is raised above this point there is a tendency to approach a substitution which gives water solubility, thus endangering the essential protective function of the film. Methoxy contents less than 10 percent are to be avoided because such materials show much the same properties and exhibit the disadvantages of fibrous cellulosic barrier layers, in that they have low and variable permeability, their power to absorb electrolyte is undesirably low, they introduce undesirably high internal resistance into the cell and allow undesired migration of the anode contact layer. Thus the non-fibrous character of barrier films of the present invention is of distinct importance.

Wet strength varies somewhat with methoxy content. Methyl cellulose films having a methoxy content of from 10 to 15 percent show surprisingly good wet strength. For example, they may be handled and rinsed in water at temperatures of 50° C. or higher without damage. Thus methyl cellulose films of higher methoxy content which may show a tendency to split or break when wet and unsupported may readily be supported on rolls or sheets to preserve their integrity during wet treatment or drying.

Alkali soluble methyl cellulose barrier films of this invention may be prepared by forming a solution of the methyl cellulose in 10 percent aqueous sodium hydroxide, casting a layer of the solution in any desired manner and exposing the layer to a coagulating bath containing a coagulating amount of acid and a coagulating salt of the acid. Ammonium chloride and hydrochloric acid are particularly preferred as a salt and acid. A layer of methyl cellulose dissolved in caustic solution may also be solidified by treatment with an acid salt as for example $NaHSO_4$. In any case the precipitated film is washed in water until it is substantially free of acid and salt and is dried to form a tough flexible sheet. The precipitated methyl cellulose film may also be incorporated as a barrier film into a dry cell in the wet form, e.g. without drying.

Alkali soluble methyl cellulose ether is supplied in a range of viscosity types. The viscosity type may be defined as the viscosity in centipoises of a 2 percent solution of alkali soluble methyl cellulose dissolved in an aqueous solution of NaOH (4 percent NaOH solution for 10–14 percent methoxy material and 2 percent NaOH solution for 14–18 percent methoxy material) determined at 20° C. An alkali soluble methyl cellulose of a viscosity type of at least 50 is required for the formation of films of this invention. Material of a viscosity type of at least 100 is preferred.

It will be understood that thickness of the barrier films of this invention may be varied over wide ranges depending on the desired characteristics of the cells in which they are employed. Thickening of the barrier film tends somewhat to increase the internal resistance of the cell. Generally thicker films should be employed where heavy cell drain or rigorous operating conditions are contemplated. In general thicknesses of the dry barrier films of this invention of from 0.001 to 0.01 inch have been found suitable. In most instances dry films of a thickness between 0.001 and 0.002 inch are preferred. The thickness of the film as spread prior to treatment in the coagulating bath is considerably more than the thickness of the final dried film. For example in one instance a film of a thickness of 0.020 inch prior to treatment in the coagulating bath resulted in a dry film having a thickness of 0.0015 inch. The aqueous alkali solution of methyl cellulose varies somewhat in viscosity according to temperature. Thus solutions decrease in viscosity as the temperature is raised from 15° C. to 30° C. However, at about 35° C. a gelation point is reached and since gelation is undesirable in the flowing of films for treatment in the coagulating bath to produce films of this invention, the aqueous alkali solution of methyl cellulose should not be subjected to temperatures in excess of about 33° C. when flowing or extruding films for coagulation.

The following examples are given as illustrating embodiments of our invention:

Example I

A 220 gram portion of 250 cps. viscosity type methyl cellulose having an 18.6 percent methoxy content is added to 850 cc. boiling distilled water, and is mixed to wet the fibers thoroughly. To this hot mixture is added 940 cc. of a 10 percent aqueous NaOH solution. The resulting mass is thoroughly mixed and placed in a closed container and stored at about 0° C. for a period long enough, e.g., overnight, to produce a relatively clear fiber-free solution. This solution possesses a viscosity of 10,000 cps. or more and appears to be stable at temperatures of 0° C. for considerable periods if protected from moisture loss and access of carbon dioxide. The methyl cellulose solution prepared above is spread in a thin layer on a glass plate by a casting bar adjusted to give a uniform layer about 0.020 inch thick. The coated plate is immersed in 3000 cc. of an aqueous solution containing 25 percent $NH_4Cl$ and 100 cc. concentrated HCl reagent. The film is exposed to this solution at 20° C. for 10 minutes and is then removed, drained free of excess liquid, and is washed free of salt by leaching in a water bath at 50° C. The washed film is then carefully squeezed to remove excess water, and allowed to dry in a stream of air at 25° C.

Example II

To 230 grams of methyl cellulose having a viscosity type of 142 cps. and a 10.3 percent methoxy content there was added 850 cc. of boiling distilled water and the mixture was agitated to wet the fibers thoroughly. To this hot mixture 1000 cc. of 5 percent aqueous NaOH solution was added and the resulting composition was thoroughly mixed and stored at 0° C. for four hours. A relatively clear fiber-free solution resulted. This solution was spread on a glass plate to a thickness of about 0.0020 inch and the plate was immersed in an aqueous solution containing 100 grams of $NaHSO_4$ in 750 ml. of water at 25° C. for ten minutes. Thereafter the film was peeled off the plate and washed in water at 45° C. The wet film was tough, flexible and exhibited a high degree of wet strength. After having been washed free of salts the film was air dried to form a tough flexible thin layer of surprising strength. The film had an average dry thickness of 0.0015 inch. The film was assembled in a zinc anode dry battery and the cells showed surprising shelf life as well as unusually good response to service tests.

Having described our invention, what we claim as new and desire to secure by Letters Patent is:

1. A barrier film portion adapted for use in primary galvanic dry cells comprising dilute alkali-soluble, non-fibrous, bibulous, water insoluble substantially insolubilizing acid free and salt free methyl cellulose ether having 10 percent to 20 percent methoxy content based on the dry weight of said methyl cellulose ether.

2. In a dry cell containing an anode, an insoluble cathode, depolarizer mix, electrolyte, and a water soluble anode-contacting material in adhesive contact with said anode intermediate the anode and cathode, a non-fibrous, insolubilizing acid-free, bibulous, ionically permeable, electrolyte-insoluble, dilute alkali-soluble barrier film disposed intermediate said anode-contacting material and said depolarizer mix comprising methyl cellulose ether having a methoxy content of 10 percent to 20 percent by weight thereof said film having a thickness from 0.001 to 0.01 inch.

3. In a dry cell adapted for storage and service at relatively low temperatures and containing an anode, an insoluble cathode, depolarizer mix, a water-soluble anode-contacting material in adhesive contact with said anode intermediate the anode and the cathode, and an electrolyte comprising water and a salt selected from the group consisting of calcium chloride and lithium chloride, a non-fibrous, insolubilizing acid-free, bibulous, ionically permeable, electrolyte-insoluble barrier film disposed intermediate said anode-contacting material and said depolarizer mix comprising a film of non-fibrous, dilute alkali-soluble methyl cellulose ether having a methoxy content between about 15 percent and 20 percent by weight of said methyl cellulose ether, said film having a thickness from 0.001 to 0.01 inch.

4. In a dry cell containing a magnesium anode, an insoluble cathode, a cathodic depolarizing mix, an electrolyte including water and magnesium bromide, and a water soluble anode-contacting material in adhesive contact with said magnesium anode intermediate the anode and the cathodic depolarizing mix, a non-fibrous, insolubilizing acid-free, bibulous, ionically permeable insoluble barrier film disposed intermediate said anode contacting material comprising alkali-soluble methyl cellulose ether having a methoxy content of 10 percent to 20 percent by weight thereof, said film having a thickness from 0.001 to 0.01 inch.

References Cited in the file of this patent
UNITED STATES PATENTS

| | | |
|---|---|---|
| 2,157,530 | Ellsworth et al. | May 9, 1939 |
| 2,534,336 | Cahoon | Dec. 19, 1950 |
| 2,551,799 | Hatfield | May 8, 1951 |

OTHER REFERENCES

"High Polymers," vol. v, part II. Copyright 1954, pages 930 and 936.